US011974038B2

(12) United States Patent
Saito

(10) Patent No.: US 11,974,038 B2
(45) Date of Patent: *Apr. 30, 2024

(54) DISPLAY CONTROL DEVICE AND DISPLAY CONTROL METHOD FOR IMAGE CAPTURE BY CHANGING IMAGE CAPTURE SETTINGS

(71) Applicant: SONY CORPORATION, Tokyo (JP)

(72) Inventor: Toshiki Saito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/136,536

(22) Filed: Dec. 29, 2020

(65) Prior Publication Data

US 2021/0120190 A1   Apr. 22, 2021

Related U.S. Application Data

(63) Continuation of application No. 15/895,158, filed on Feb. 13, 2018, now Pat. No. 10,911,683, which is a (Continued)

(30) Foreign Application Priority Data

Aug. 1, 2012   (JP) ................... 2012-171037

(51) Int. Cl.
  *H04N 23/63*   (2023.01)
  *G06F 16/583*   (2019.01)
  (Continued)

(52) U.S. Cl.
  CPC ....... *H04N 23/633* (2023.01); *G06F 16/5838* (2019.01); *G06Q 50/01* (2013.01);
  (Continued)

(58) Field of Classification Search
  CPC ......... H04N 5/232939; H04N 5/23206; H04N 1/00352; H04N 1/00442; H04N 1/215;
  (Continued)

(56) References Cited

U.S. PATENT DOCUMENTS 7,203,367 B2 *   4/2007   Shniberg ............. G06F 16/5854
                                                          707/E17.03
7,304,677 B2   12/2007   Keelan et al.
(Continued)

FOREIGN PATENT DOCUMENTS

CN   1741005 A   3/2006
CN   101365061 A   2/2009
(Continued)

OTHER PUBLICATIONS

Non-Final Office Action for U.S. Appl. No. 15/895,158, dated Jun. 26, 2019, 16 pages.
(Continued)

*Primary Examiner* — Padma Haliyur
(74) *Attorney, Agent, or Firm* — CHIP LAW GROUP

(57) ABSTRACT

An information processing system that acquires a first captured image; acquires a plurality of second images; and generates display data including the first captured image and at least a subset of the plurality of second images based on an evaluation parameter corresponding to each of the plurality of second images.

12 Claims, 13 Drawing Sheets

Related U.S. Application Data continuation of application No. 14/407,740, filed as application No. PCT/JP2013/003844 on Jun. 20, 2013, now Pat. No. 9,930,260.

(51) Int. Cl.
| | |
|---|---|
| *G06Q 50/00* | (2012.01) |
| *G06V 20/30* | (2022.01) |
| *H04N 1/00* | (2006.01) |
| *H04N 1/21* | (2006.01) |
| *H04N 23/661* | (2023.01) |

(52) U.S. Cl.
CPC ......... *G06V 20/30* (2022.01); *H04N 1/00352* (2013.01); *H04N 1/00442* (2013.01); *H04N 1/215* (2013.01); *H04N 23/661* (2023.01); *H04N 2201/0084* (2013.01)

(58) Field of Classification Search
CPC ......... H04N 2201/0084; H04N 23/633; H04N 23/661; G06F 16/5838; G06K 9/00677; G06Q 50/01; G06V 20/30
See application file for complete search history.

(56) References Cited

U.S. PATENT DOCUMENTS

| | | | |
|---|---|---|---|
| 7,321,919 | B2 | 1/2008 | Jacobs et al. |
| 9,390,316 | B2 * | 7/2016 | Okamura ............... G06V 20/30 |
| 2002/0008765 | A1 * | 1/2002 | Ejima ............. H04N 5/232935 |
| | | | 348/E5.047 |
| 2006/0271691 | A1 | 11/2006 | Jacobs et al. |
| 2006/0284994 | A1 * | 12/2006 | Kim .................. H04N 1/00458 |
| | | | 348/231.2 |
| 2009/0307220 | A1 | 12/2009 | Bennett |
| 2009/0313239 | A1 | 12/2009 | Wen et al. |
| 2010/0177967 | A1 | 7/2010 | Lee et al. |
| 2011/0187914 | A1 | 8/2011 | Lee |
| 2011/0314049 | A1 | 12/2011 | Poirier et al. |
| 2012/0054658 | A1 | 3/2012 | Chuat et al. |
| 2012/0226680 | A1 | 9/2012 | Bennett |
| 2012/0230610 | A1 | 9/2012 | Lee et al. |
| 2012/0249808 | A1 * | 10/2012 | Hirota ................ H04N 21/4788 |
| | | | 348/207.1 |
| 2013/0239063 | A1 * | 9/2013 | Ubillos ............... G06F 3/04845 |
| | | | 715/838 |
| 2014/0003716 | A1 | 1/2014 | Fedorovskaya et al. |

FOREIGN PATENT DOCUMENTS

| | | |
|---|---|---|
| CN | 101777064 A | 7/2010 |
| CN | 102144231 A | 8/2011 |
| CN | 102333177 A | 1/2012 |
| EP | 2300947 A2 | 3/2011 |
| JP | 2002-288199 A | 10/2002 |
| JP | 2003-167832 A | 6/2003 |
| JP | 2004-070614 A | 3/2004 |
| JP | 2004-171375 A | 6/2004 |
| JP | 2005-100160 A | 4/2005 |
| JP | 2007-243397 A | 9/2007 |
| JP | 2008-083738 A | 4/2008 |
| JP | 2008-299472 A | 12/2008 |
| JP | 2009-071661 A | 4/2009 |
| JP | 2010-028713 A | 2/2010 |
| JP | 2010-033342 A | 2/2010 |
| JP | 2011-097328 A | 5/2011 |
| JP | 2011-118911 A | 6/2011 |
| WO | 2009/125450 A1 | 10/2009 |
| WO | 2010/005751 A1 | 1/2010 |

OTHER PUBLICATIONS

Non-Final Office Action for U.S. Appl. No. 15/895,158, dated Mar. 5, 2020, 18 pages.
Final Office Action for U.S. Appl. No. 15/895,158, dated Oct. 22, 2019, 16 pages.
Final Office Action for U.S. Appl. No. 15/895,158, dated Jun. 12, 2020, 19 pages.
Advisory Action for U.S. Appl. No. 15/895,158, dated Jan. 10, 2020, 05 pages.
Advisory Action for U.S. Appl. No. 15/895,158, dated Jul. 29, 2020, 02 pages.
Notice of Allowance for U.S. Appl. No. 15/895,158, dated Sep. 30, 2020, 09 pages.
Extended European Search Report of EP Application No. 18211044.5, dated Apr. 4, 2019, 07 pages.
Office Action for JP Patent Application No. 2012-171037, dated Jan. 23, 2018, 15 pages of Office Action and 12 pages of English Translation.
Office Action for JP Patent Application No. 2012-171037, dated Aug. 22, 2017, 09 pages of Office Action and 09 pages of English Translation.
Extended European Search Report of EP Patent Application No. 13737436.9, dated Jul. 10, 2017, 05 pages.
Office Action for CN Patent Application No. 2013800391545, dated Apr. 28, 2017, 14 pages of Office Action and 22 pages of English Translation.
Office Action for JP Patent Application No. 2012-171037, dated Mar. 1, 2017, 04 pages of Office Action and 03 pages of English Translation.
Office Action for JP Patent Application No. 2012-171037, dated Nov. 1, 2016, 04 pages of Office Action and 03 pages of English Translation.
Office Action for JP Patent Application No. 2012-171037, dated Apr. 5, 2016, 04 pages of Office Action and 04 pages of English Translation.
International Preliminary Report on Patentability of PCT Application No. PCT/JP2013/003844, dated Feb. 12, 2015, 05 pages.
International Search Report and Written Opinion of PCT Application No. PCT/JP2013/003844, dated Sep. 17, 2013, 06 pages.
Non-Final Office Action for U.S. Appl. No. 14/407,740, dated Dec. 18, 2015, 17 pages.
Non-Final Office Action for U.S. Appl. No. 14/407,740, dated Sep. 8, 2016, 20 pages.
Non-Final Office Action for U.S. Appl. No. 14/407,740, dated Jun. 9, 2017, 21 pages.
Final Office Action for U.S. Appl. No. 14/407,740, dated May 19, 2016, 21 pages.
Final Office Action for U.S. Appl. No. 14/407,740, dated Feb. 14, 2017, 24 pages.
Advisory Action for U.S. Appl. No. 14/407,740, dated Jul. 29, 2016, 03 pages.
Advisory Action for U.S. Appl. No. 14/407,740, dated Apr. 24, 2017, 03 pages.
Notice of Allowance for U.S. Appl. No. 14/407,740, dated Nov. 14, 2017, 08 pages.
Notice of Allowance for U.S. Appl. No. 14/407,740, dated Nov. 22, 2017, 02 pages.
Office Action for CN Patent Application No. 201810898719.X, dated Jul. 2, 2020, 10 pages of Office Action and 13 pages of English Translation.
Office Action for CN Patent Application No. 201810897100.7, dated May 25, 2021, 8 pages of Office Action and 11 pages of English Translation.

* cited by examiner

[Fig. 1]
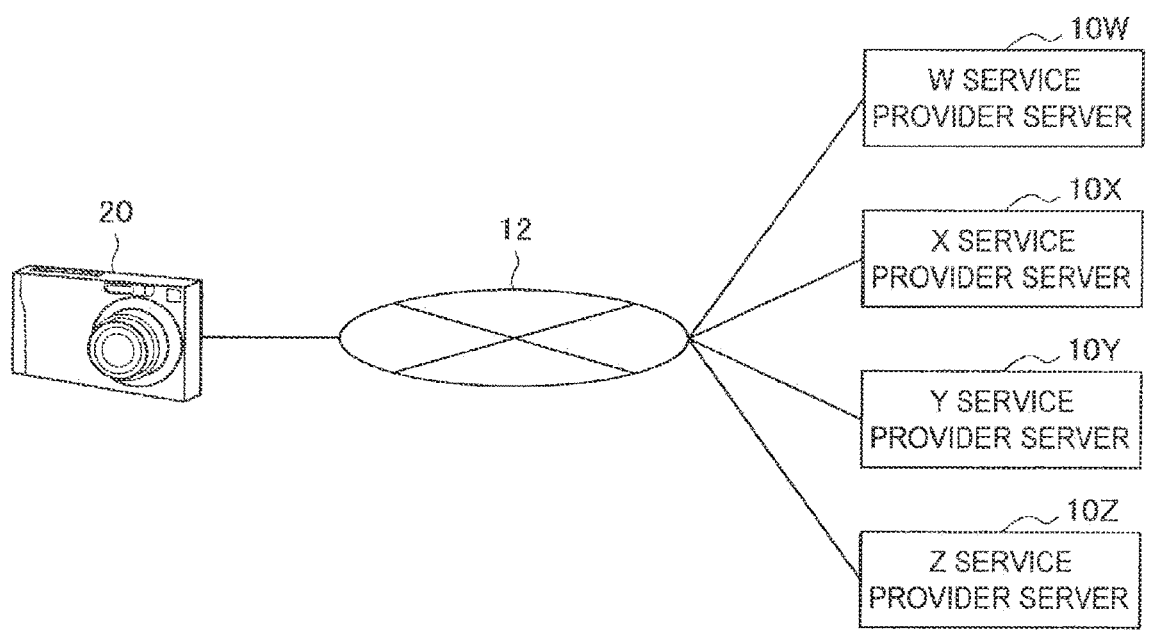

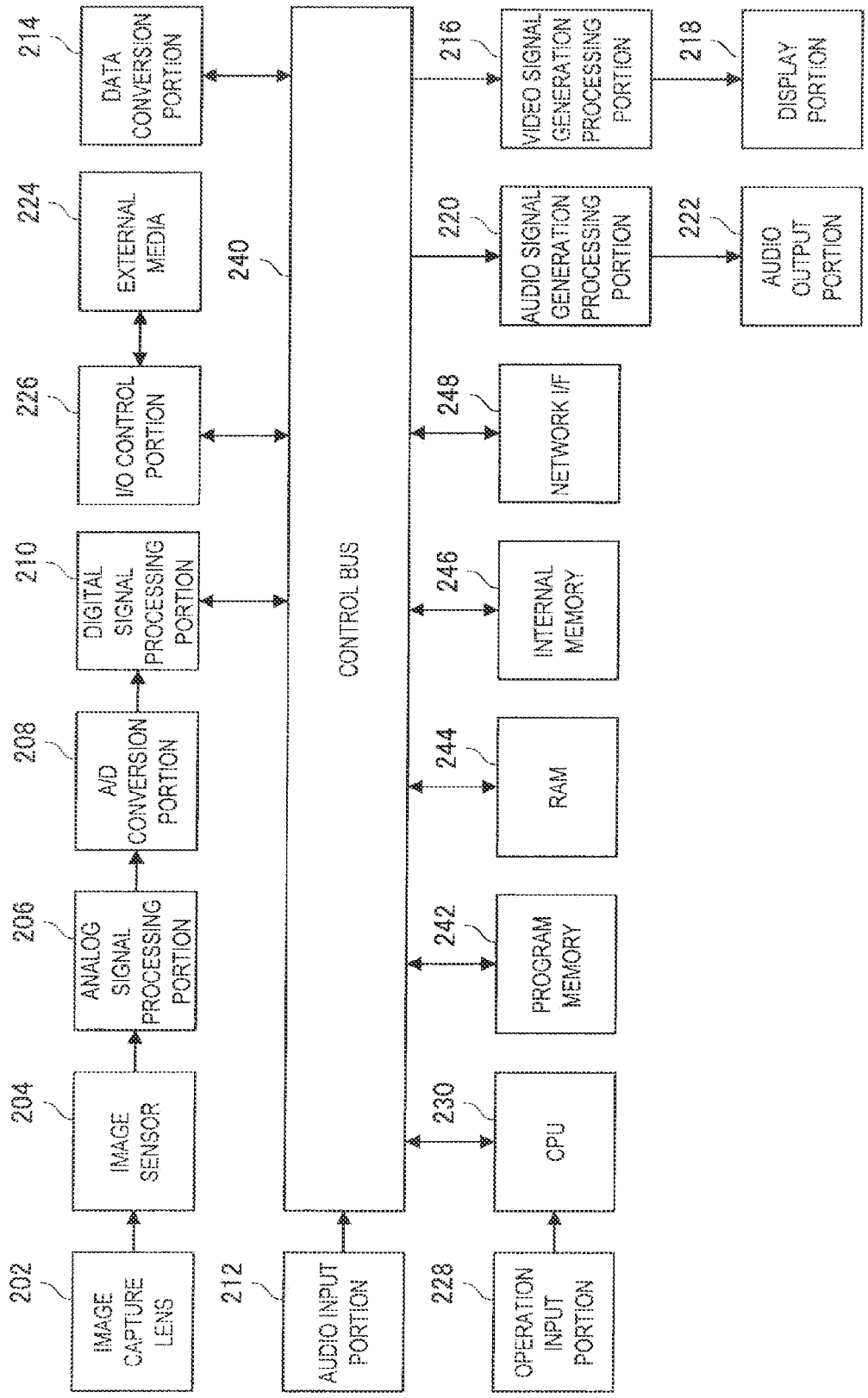

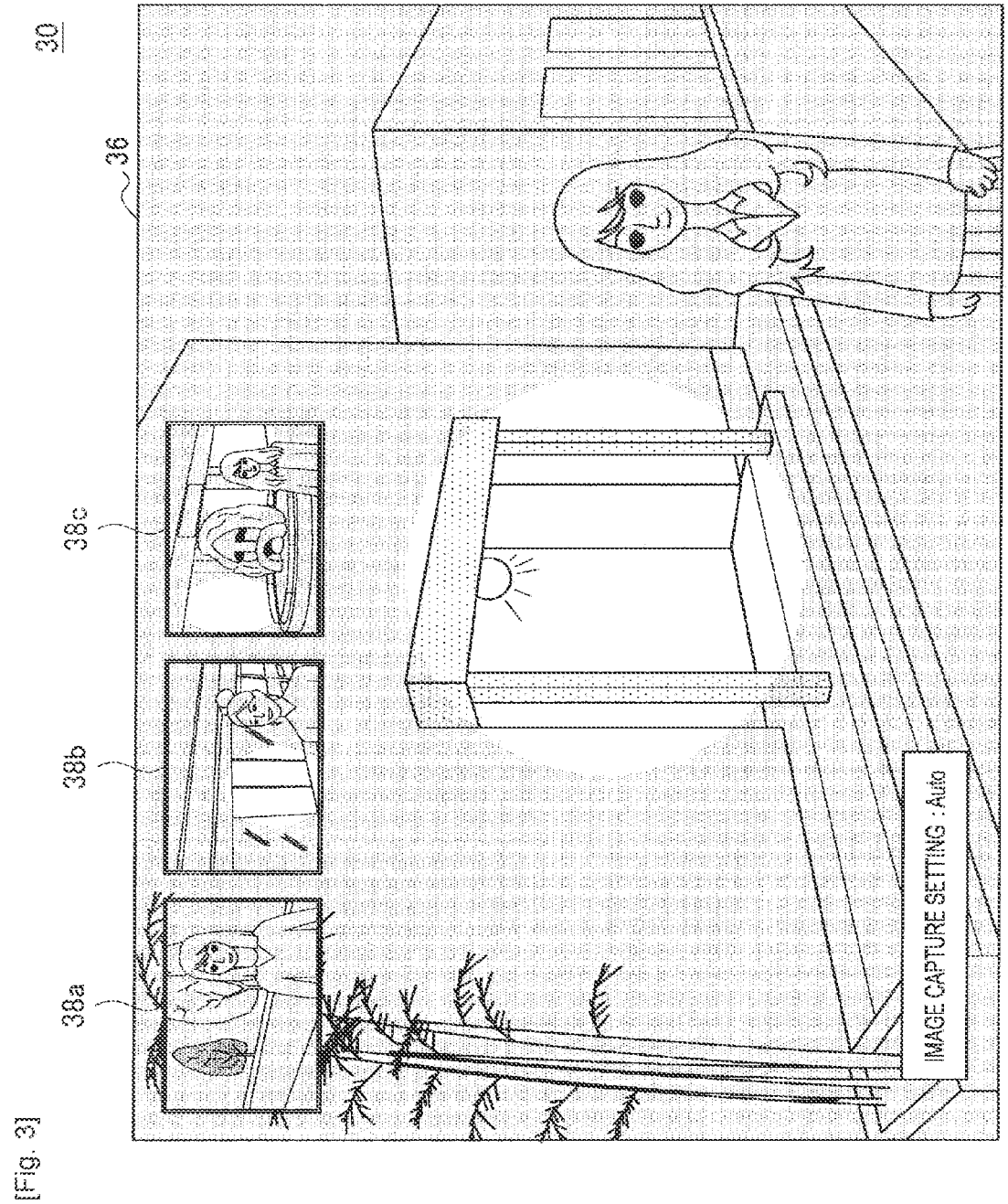

[Fig. 4]
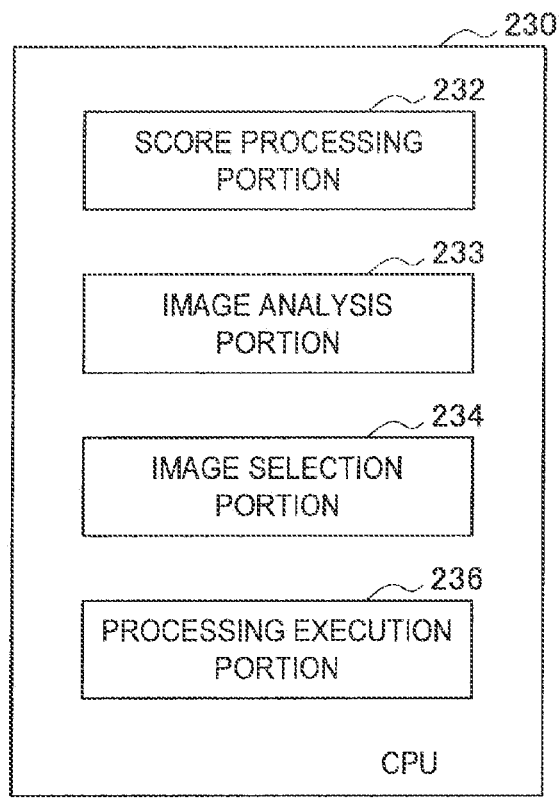
[Fig. 5]
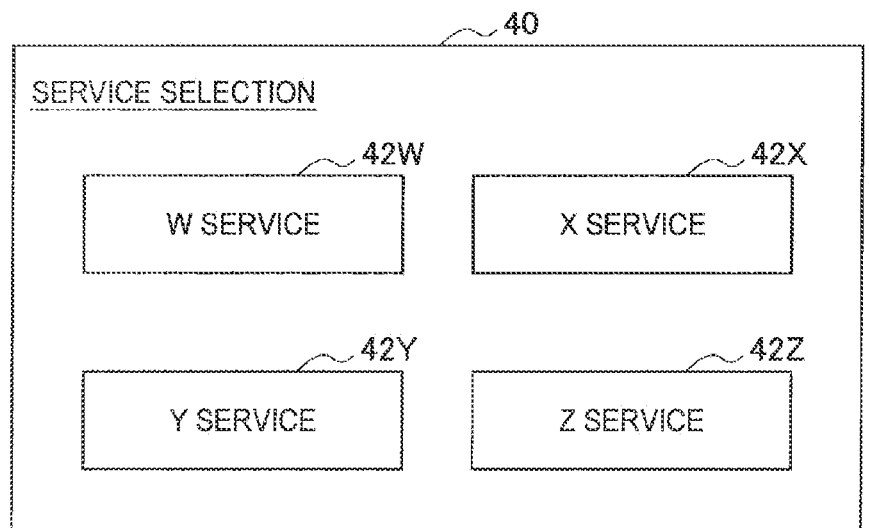

[Fig. 6]
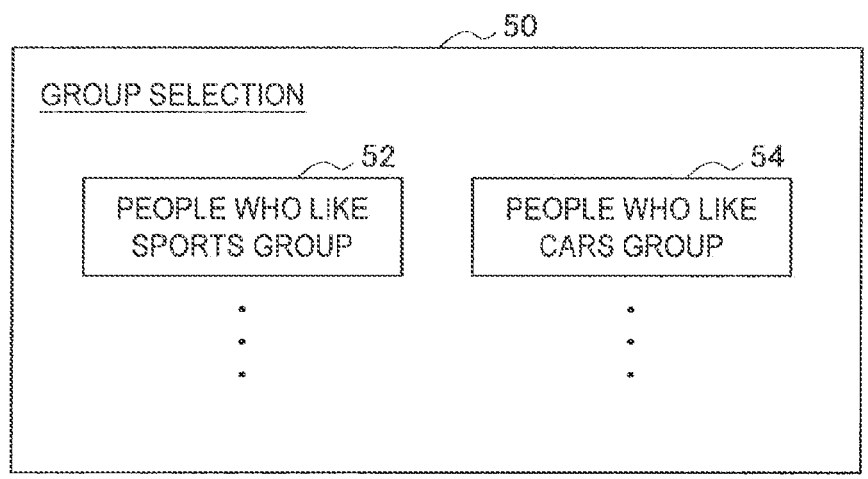
[Fig. 7]
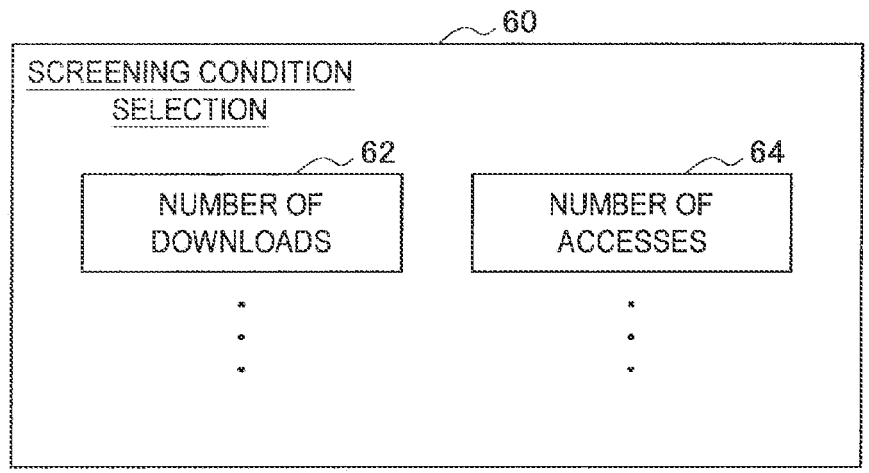

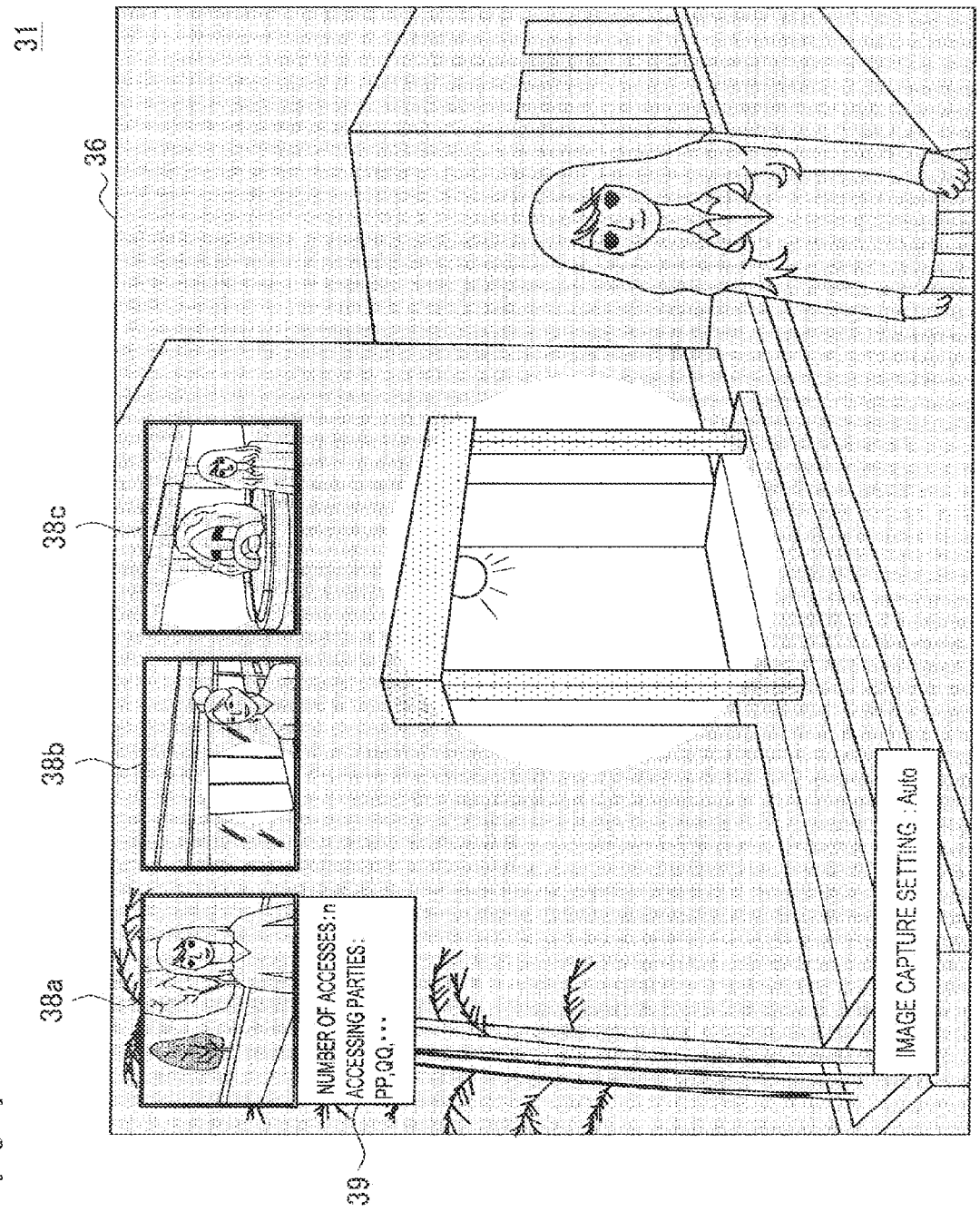

[Fig. 9]
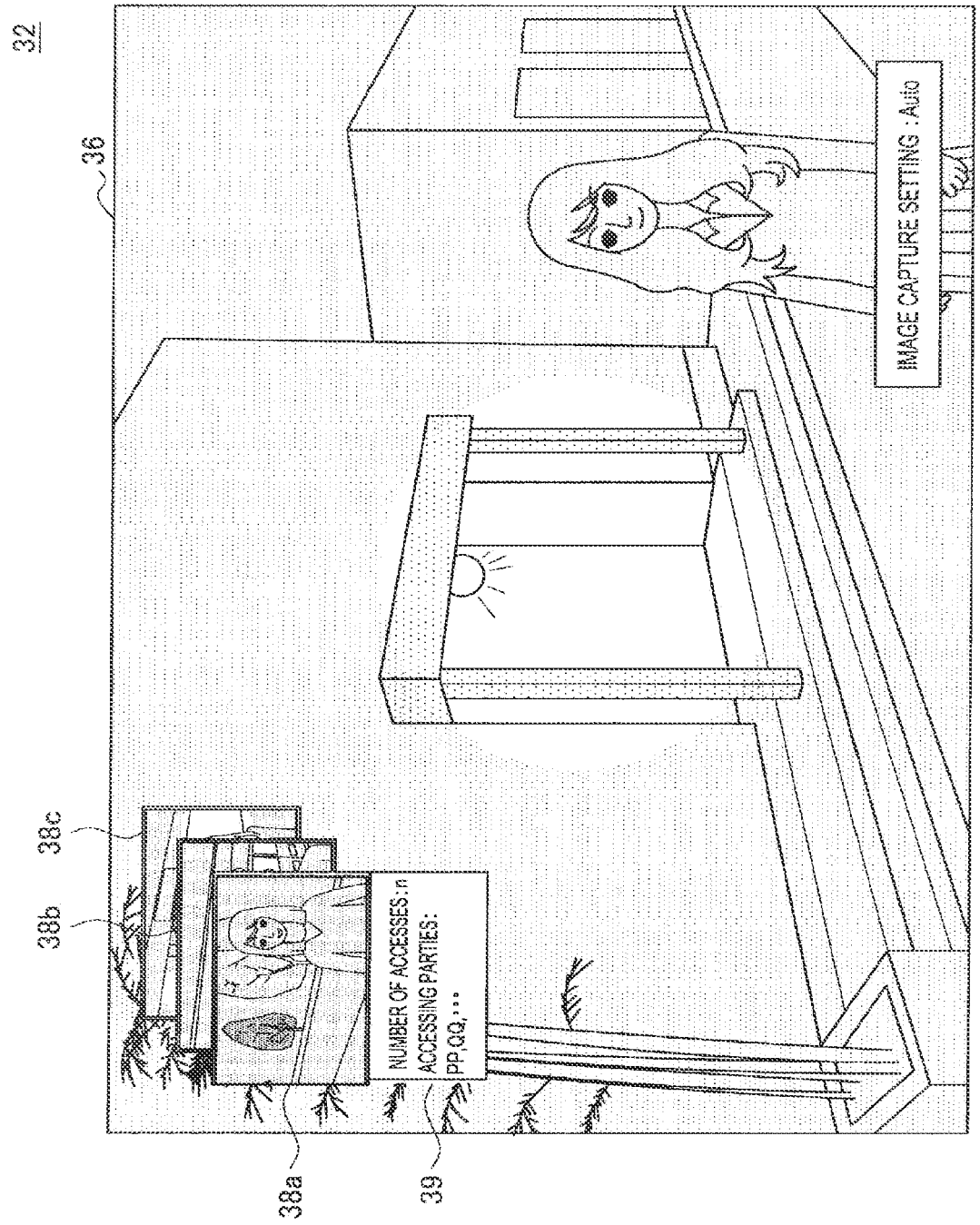

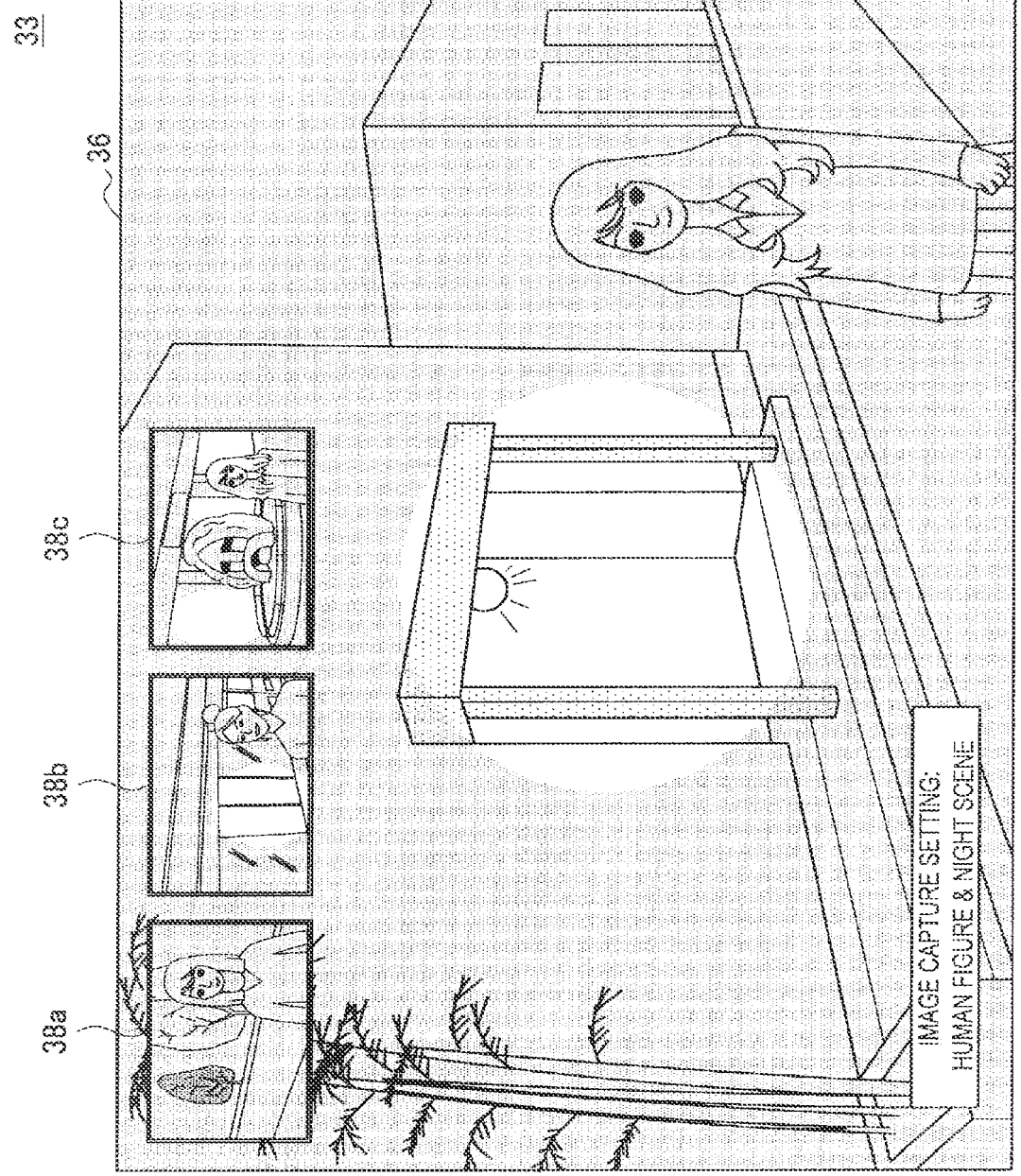

[Fig. 11]
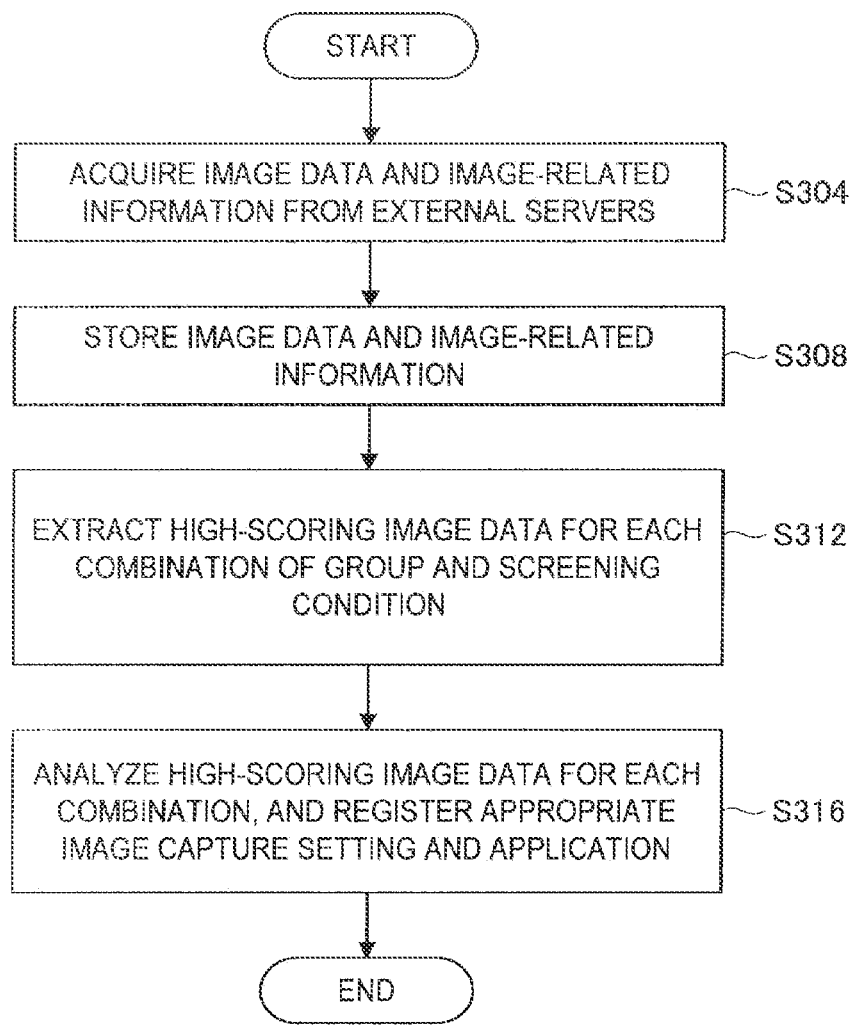

[Fig. 12]
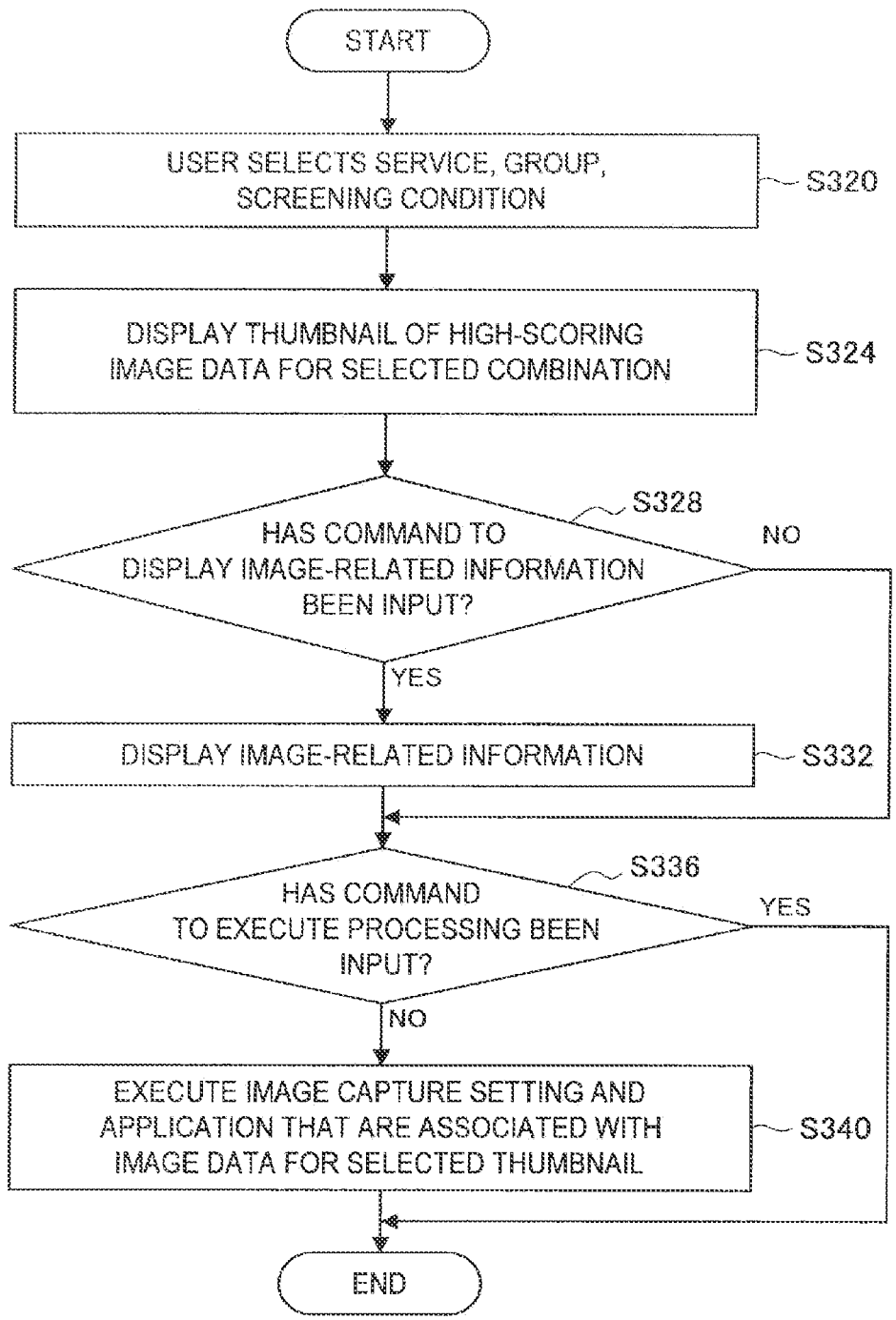

[Fig. 13]
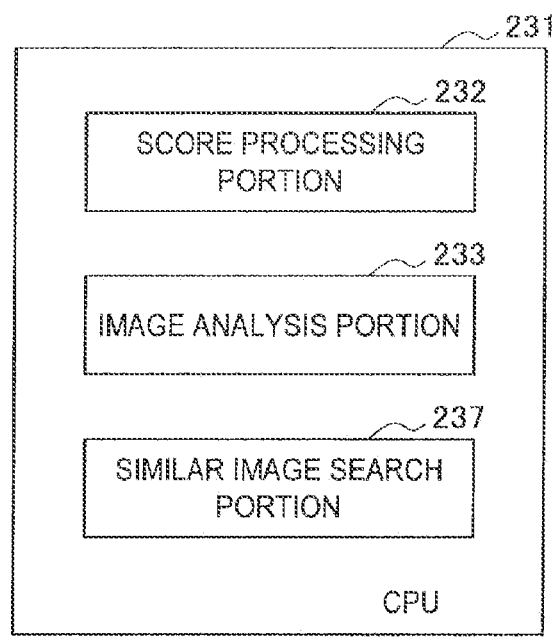

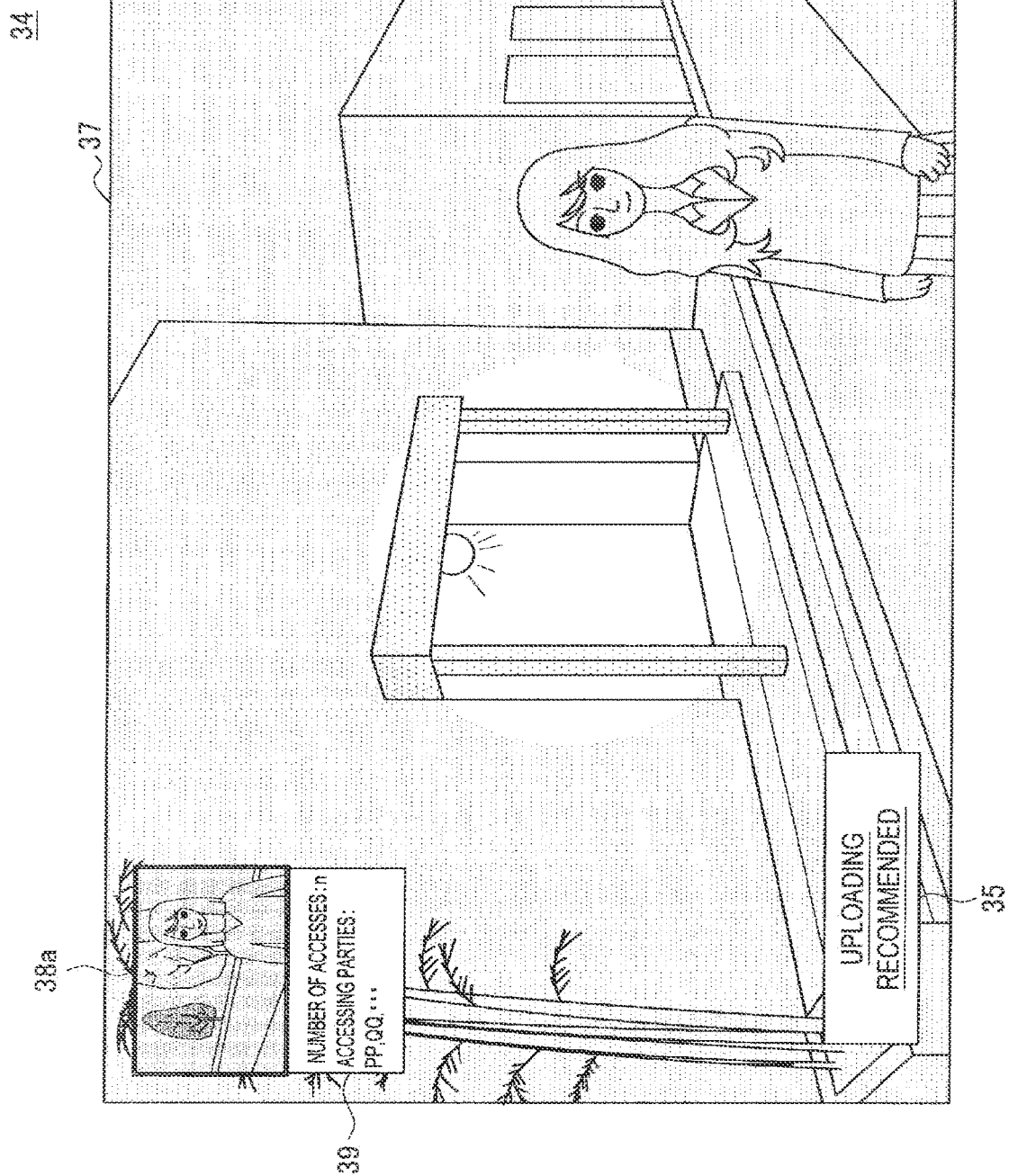

[Fig. 15]
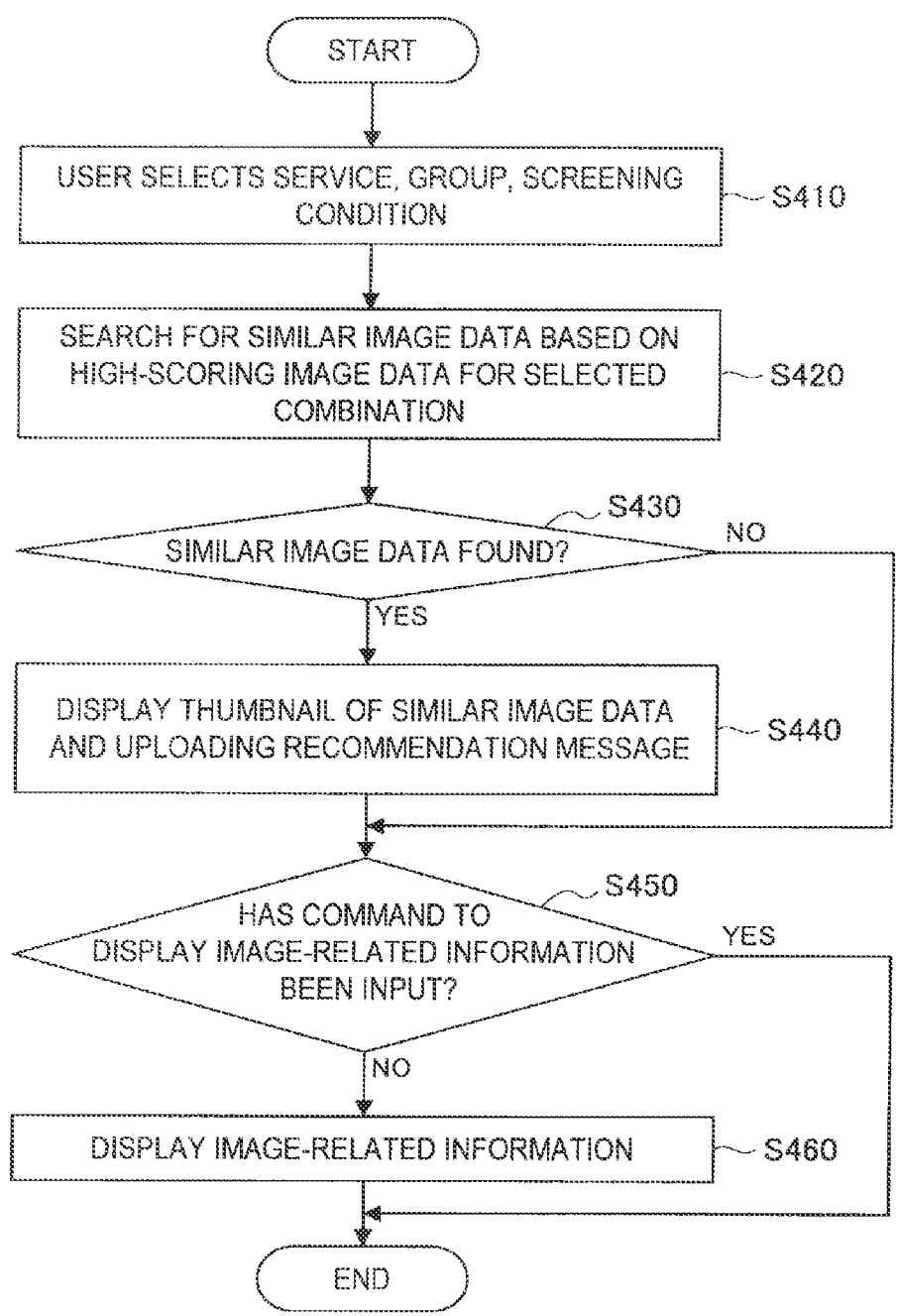

DISPLAY CONTROL DEVICE AND DISPLAY CONTROL METHOD FOR IMAGE CAPTURE BY CHANGING IMAGE CAPTURE SETTINGS

CROSS REFERENCE PARAGRAPH

The present application is a continuation application of U.S. patent application Ser. No. 15/895,158, filed Feb. 13, 2018 which is a continuation of U.S. patent application Ser. No. 14/407,740, filed Dec. 12, 2014, now U.S. Pat. No. 9,930,260, which is a national stage entry of PCT/JP2013/003844, filed Jun. 20, 2013, and which contains subject matter related to that disclosed in Japanese Priority Patent Application JP 2012-171037 filed in the Japan Patent Office on Aug. 1, 2012, the entire contents of which are hereby incorporated by reference.

TECHNICAL FIELD

The present disclosure relates to a display control device, a display control method, and a program.

BACKGROUND ART

Recently, as network environments have expanded, it has become possible for a plurality of users to share information and images through a network. For example, by uploading to a network server an image that has been acquired by an image capture device, a user can make the image publicly available to other users. Therefore, cases occur in which the user tries to acquire and upload an image that will attract significant attention from other users.

In connection with this point, a technology is disclosed in PTL 1 that classifies an object image as an image that the user wants or does not want to show to others.

According to this technology, the object image can be classified based on the preferences of the user himself.

CITATION LIST

Patent Literature

[PTL 1]
JP 2009-71661A

SUMMARY

Technical Problem

However, the preferences of the other users are not reflected in the classifying by the technology described above. It is therefore difficult for the user to know, before uploading the image, what sort of image will attract the attention of other users and to what extent the object image will attract the attention of other users.

Accordingly, the present disclosure provides a display control device, a display control method, and a program that are new and improved and that are capable of showing to the user what sorts of images will attract the attention of other users.

Solution to Problem

According to an embodiment of the present disclosure, there is provided an information processing system that acquires a first captured image; acquires a plurality of second images; and generates display data including the first captured image and at least a subset of the plurality of second images based on an evaluation parameter corresponding to each of the plurality of second images.

According to an embodiment of the present disclosure, there is provided an information processing method including: acquiring a first captured image; acquiring a plurality of second images; and generating display data including the first captured image and at least a subset of the plurality of second images based on an evaluation parameter corresponding to each of the plurality of second images.

According to an embodiment of the present disclosure, there is provided computer-program instructions, which when executed by an information processing system, cause the system to: acquire a first captured image; acquire a plurality of second images; and generate display data including the first captured image and at least a subset of the plurality of second images based on an evaluation parameter corresponding to each of the plurality of second images.

Advantageous Effects of Invention

According to the embodiments of the present disclosure as described above, it is possible to show to the user what sorts of images will attract the attention of other users.

BRIEF DESCRIPTION OF DRAWINGS

FIG. 1 is an explanatory figure that shows a configuration of an image publication support system according to an embodiment of the present disclosure.

FIG. 2 is a functional block diagram that shows a configuration of an image capture device.

FIG. 3 is an explanatory figure that shows a specific example of a display screen.

FIG. 4 is an explanatory figure that shows functions of a CPU of the image capture device according to a first embodiment.

FIG. 5 is an explanatory figure that shows a specific example of a service selection screen.

FIG. 6 is an explanatory figure that shows a specific example of a group selection screen.

FIG. 7 is an explanatory figure that shows a specific example of a screening condition selection screen.

FIG. 8 is an explanatory figure that shows a specific example of a display screen that includes image-related information.

FIG. 9 is an explanatory figure that shows a modified example of the display screen.

FIG. 10 is an explanatory figure that shows a specific example of a display screen to which an image capture setting has been applied.

FIG. 11 is a flowchart that shows an operation when image data are acquired.

FIG. 12 is a flowchart that shows an operation when an image is captured.

FIG. 13 is an explanatory figure that shows functions of a CPU of the image capture device according to a second embodiment.

FIG. 14 is an explanatory figure that shows a specific example of a display screen according to the second embodiment.

FIG. 15 is a flowchart that shows an operation of the image capture device according to the second embodiment.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The present disclosure will be explained in the order shown below.

1. Basic configuration of image publication support system
2. First Embodiment
2-1. Configuration of image capture device according to the first embodiment
2-2. Operation of the image capture device according to the first embodiment
3. Second Embodiment
3-1. Configuration of the image capture device according to the second embodiment
3-2. Operation of the image capture device according to the second embodiment
4. Conclusion 1. Basic Configuration of Image Publication Support System The technology according to the embodiment of the present disclosure, examples of which will be explained in detail in "2. First embodiment" and "3. Second embodiment", can be implemented in various forms. Further, an image capture device 20 according to each of the embodiments, which has a function as a display control device, is provided with A. an acquisition portion (a network I/F 248) that acquires image data for at least one image from at least one service provider server on a network that controls the image data, and B. a display control portion (a video signal generation processing portion 216) that generates a display screen that includes an object image and a display that is based on data, among the data that have been acquired by the acquisition portion, that pertain to a set of the image data, among the at least one set of the image data, and that are in accordance with a degree of attention for the set of the image data.

Hereinafter, first, a basic configuration of an image publication support system that includes the image capture device 20 will be explained.

FIG. 1 is an explanatory figure that shows the configuration of the image publication support system according to the embodiments of the present disclosure. As shown in FIG. 1, the image publication support system according to the embodiments of the present disclosure is provided with a network 12, the image capture device 20, a W service provider server 10W, an X service provider server 10X, a Y service provider server 10Y, and a Z service provider server 10Z. Note that, hereinafter, the W service provider server 10W, the X service provider server 10X, the Y service provider server 10Y, and the Z service provider server 10Z will be collectively called the service provider servers 10, as necessary.

The image capture device 20 and the service provider servers 10 are connected through the network 12. The network 12 is a transmission path that is one of wired and wireless and through which information is transmitted from devices that are connected to the network 12. For example, the network 12 may be a public network such as the Internet, a telephone network, a satellite communications network, or the like, and it may also be one of various types of local area networks (LANs), including an Ethernet (registered trademark) network, and a wide area network (WAN). The network 12 may also be a dedicated network such as an Internet Protocol Virtual Private Network (IP-VPN) or the like.

Each of the service provider servers 10 manages image data that have been uploaded by various users. Each of the service provider servers 10 manages the number of accesses, the number of downloads, and the like for each set of the image data. Note that in many cases, each of the service provider servers 10 manages a plurality of users by dividing the users into groups.

The image capture device 20 performs capture of the image data, storage of the image data that have been acquired by the image capture, playback of the image data, and the like. Hereinafter, the configuration of the image capture device 20 will be explained with reference to FIG. 2.

Configuration of the image capture device FIG. 2 is a functional block diagram that shows the configuration of the image capture device 20. As shown in FIG. 2, the image capture device 20 is provided with an image capture lens 202, an image sensor 204, an analog signal processing portion 206, an A/D conversion portion 208, a digital signal processing portion 210, an audio input portion 212, a data conversion portion 214, the video signal generation processing portion 216, a display portion 218, an audio signal generation processing portion 220, an audio output portion 222, an external media 224, an I/O control portion 226, an operation input portion 228, a central processing unit (CPU) 230, a program memory 242, a random access memory (RAM) 244, an internal memory 246, the network I/F 248, and a control bus 240. Data are communicated among the digital signal processing portion 210, the I/O control portion 226, the audio input portion 212, the data conversion portion 214, the CPU 230, the program memory 242, the RAM 244, the internal memory 246, the network I/F 248, and the like through the control bus 240.

The image capture lens 202 collects light that comes from a subject and forms an image of the subject in an imaging area of the image sensor 204. The image sensor 204 takes the image of the subject that has been formed in the imaging area and converts into an electric image signal. The image capture lens 202 and the image sensor 204 thus function as an image capture portion. The analog signal processing portion 206 performs analog processing on the image signal that is input from the image sensor 204, and the A/D conversion portion 208 converts the data format of the image signal for which the analog processing has been performed by the analog signal processing portion 206 into a digital format. The digital signal processing portion 210 performs digital processing on the image signal that has been converted into the digital format and outputs image data that are produced by the digital processing.

The audio input portion 212 acquires audio data by collecting sound. The audio data are output through the control bus 240 to the internal memory 246, the data conversion portion 214, or the like.

The data conversion portion 214 processes, as necessary, the audio data that have been output from the audio input portion 212, the image data that have been output from the digital signal processing portion 210, audio data and image data that have been read from one of the internal memory 246 and the external media 224, and the like.

The video signal generation processing portion 216 is a display control portion that generates a video signal based on image data that are supplied from the digital signal processing portion 210, the data conversion portion 214, the CPU 230, or the like. The display portion 218 displays an image based on the video signal that is supplied from the video signal generation processing portion 216. Note that the display portion 218 may be one of a liquid crystal display (LCD) device and an organic light-emitting diode (OLED) device.

The audio signal generation processing portion 220 generates an audio signal based on audio data that are supplied from the audio input portion 212, the data conversion portion 214, or the like. The audio output portion 222 outputs audio based on the audio signal that is supplied from the audio signal generation processing portion 220.

Note that the audio output portion 222 may be one of a speaker, headphones, and earphones.

The external media 224 is a storage medium that stores image data and audio data, and it is removably connected to the image capture device 20. The I/O control portion 226 controls reading of the image data and the audio data that are stored in the external media 224, as well as writing of the image data and the audio data to the external media 224. Note that the external media 224 may be a storage medium such as a non-volatile memory, a magnetic disk, an optical disk, a magneto-optical (MO) disk, or the like. The non-volatile memory may be, for example, a flash memory, an SD card, a micro-SD card, a USB memory, an electrically erasable programmable read-only memory (EEPROM), or an erasable programmable ROM (EPROM). Further, the magnetic disk may be a hard disk, a disk-shaped magnetic disk, or the like. Furthermore, the optical disk may be a compact disc (CD), a digital versatile disc (DVD), a Blu-Ray disc (BD) (registered trademark), or the like.

The operation input portion 228 accepts operation information input by the user and supplies to the CPU 230 the operation information that has been input by the user. For example, operation information is input to the operation input portion 228 by using operational elements of the image capture device 20, such as a moving image record/stop button, a shutter button, a power button, and the like.

The CPU 230 functions as a computational processing device and as a control device, and it controls all operations within the image capture device 20 in accordance with various types of programs. The program memory 242 stores programs, computation parameters, and the like that the CPU 230 uses. The RAM 244 is a work area for the CPU 230 and temporarily stores the programs that the CPU 230 executes, as well as parameters and the like that vary as necessary when the programs are executed. The internal memory 246 is a storage medium that stores image data and audio data.

In the same manner as the external media 224, the internal memory 246 may be a storage medium such as a non-volatile memory, a magnetic disk, an optical disk, an MO disk, or the like.

The network I/F 248 performs communication with external devices through the network 12. For example, the network I/F 248 functions as an acquisition portion that acquires image data and image-related information from each of the service provider servers 10.

The configuration of the image capture device 20 as an example of a display control device has been explained, but the display control device is not limited to being the image capture device 20. For example, the display control device may also be an information processing device such as a personal computer (PC), a home video processing device (a DVD recorder, a video deck, or the like), a personal digital assistant (PDA), a home game unit, a household electrical appliance, or the like. The display control device may also be a portable information processing device such as a smart phone, a mobile telephone, a Personal Handyphone System (PHS), a portable music playback device, a portable video processing device, a portable game unit, or the like.

2. First Embodiment

Next, the first embodiment of the present disclosure will be explained. The image capture device 20 according to the first embodiment of the present disclosure displays image data 36 that have been acquired by image capture, as well as thumbnails 38a, 38b, and 38c of image data with high degrees of attention in the service provider servers 10, as on a display screen 30 that is shown in FIG. 3. This configuration makes it possible for the user to determine whether or not the object image data 36 can attract attention when they are uploaded, and also makes it possible to efficiently capture an image that can attract attention when it is uploaded. Hereinafter, first the configuration and then the operation of the image capture device 20 according to the first embodiment of the present disclosure will be explained in detail.

2-1. Configuration of Image Capture Device According to the First Embodiment

FIG. 4 is an explanatory figure that shows functions of the CPU 230 of the image capture device 20 according to the first embodiment. As shown in FIG. 4, the CPU 230 has the functions of a score processing portion 232, an image analysis portion 233, an image selection portion 234, and a processing execution portion 236.

Score Processing

The score processing portion 232 specifies scores that indicate the degrees of attention for the image data that have been acquired from each of the service provider servers 10 through the network I/F 248, then identifies the sets of the image data that have high scores. For example, the score processing portion 232 specifies the score for each set of the image data according to screening conditions that differ for each of a plurality of groups that each of the service provider servers 10 manages. Specifically, the groups may include a friends group, a people who like sports group, a people who like cars group, and the like. To take another example, the score processing portion 232 may take the number of times that a specific set of the image data has been downloaded by users who belong to a people who like sports group that is managed by the X service provider server 10X and specify the score according to the group "people who like sports group" and the screening condition "number of downloads". Note that other screening conditions may include the number of accesses in the last three days, the number of citations, the number of comments, or the like. The score processing portion 232 also identifies the sets of the image data that have high scores for every possible combination of group and screening condition. Note that the image-related information that pertains to the image data, such as the thumbnails, the numbers of downloads, the numbers of accesses, and the like, are acquired together with the image data from each of the service provider servers 10. The acquiring of the image data and the like by the network I/F 248 and the processing by the score processing portion 232 may be performed while the image capture device 20 is not being used and may also be performed during the capturing of images.

Image Analysis

The image analysis portion 233 analyzes the Exif information, various types of meta-information, and the image data for the images for which high scores were specified according to the combinations of the groups and the screening conditions that were identified by the score processing portion 232, then uses the analysis to infer the image capture settings at the times when the images were acquired and the applications that were executed for the image data. For example, in a case where, in the image data that are being analyzed, a human figure is seen illuminated by a flash against a background with a low light level, the image analysis portion 233 infers that the image capture setting for the image data in question was "human figure and night scene". The results of the analysis by the image analysis portion 233 are stored in the internal memory 246 in association with the image data. Note that the application may be an application that imparts various types of effects, such as skin lightening processing, sepia processing, or the like.

Image Selection and Display

The image selection portion 234 selects, from the image data that have been acquired from each of the service provider servers 10 through the network I/F 248, the image data for the images for which high scores were specified according to the combinations of the groups and the screening conditions that are designated by the user in the service provider servers 10. Hereinafter, an example of a display screen for allowing the user to designate the combinations of the groups and the screening conditions in the service provider server 10 will be explained with reference to FIGS. 5 to 7.

FIG. 5 is an explanatory figure that shows a specific example of a service selection screen. As shown in FIG. 5, a service selection screen 40 includes selection items for services that are provided by each of the service provider servers 10. For example, the service selection screen 40, as shown in FIG. 5, includes a selection item 42W for the W service that the W service provider server 10W provides, a selection item 42X for the X service that the X service provider server 10X provides, a selection item 42Y for the Y service that the Y service provider server 10Y provides, and a selection item 42Z for the Z service that the Z service provider server 10Z provides.

When the user selects the desired service on the service selection screen, the image capture device 20 displays a group selection screen for selecting a group that is managed by the service provider server 10 that provides the selected service.

FIG. 6 is an explanatory figure that shows a specific example of the group selection screen. As shown in FIG. 6, a group selection screen 50 includes selection items for groups that are managed by the service provider server 10. For example, the group selection screen 50, as shown in FIG. 6, includes a selection item 52 for the people who like sports group and a selection item 54 for a people who like cars group. When the user selects the desired group on the group selection screen, the image capture device 20 displays a screening condition selection screen like that shown in FIG. 7.

FIG. 7 is an explanatory figure that shows a specific example of the screening condition selection screen. As shown in FIG. 7, a screening condition selection screen 60 includes selection items for screening conditions that correspond to methods for specifying the score. For example, as shown in FIG. 7, the screening condition selection screen 60 includes a selection item 62 for the number of downloads and a selection item 64 for the number of accesses.

The image selection portion 234 selects, from among the image data that have been acquired from each of the service provider servers 10, the image data for the images for which high scores were specified according to the combinations of the groups and the screening conditions that the user has designated and selected in the service provider servers 10 by using the display screen. Note that an example was explained above in which one each of the services, the groups, and the screening conditions were designated, but it is also possible for the user to designate pluralities of the services, groups, and screening conditions. Fixed combinations of the services, groups, and screening conditions may also be used. The combinations of the services, groups, and screening conditions may also be selected randomly.

The image selection portion 234 may also give priority to selecting, from among the image data that have high scores, one of the image data that were captured under the same conditions as the current image capture setting, the image data that include a facial image of the same human figure, the image data for which the GPS data indicate nearby locations, the image data for which the image capture times are close to the image capture time for the current image data, and the image data for which the compositions of the images are similar.

When the image data are selected by the image selection portion 234, one of the selected image data and thumbnails of the images that are described by the image data are supplied to the video signal generation processing portion 216. One of the image data that were produced while the image capture device 20 was not capturing images and the image data that were produced while the image capture device 20 was capturing images are supplied to the video signal generation processing portion 216 from the digital signal processing portion 210. The video signal generation processing portion 216 is able to generate the display screen 30 that is shown in FIG. 3 by superimposing one of the image data that were selected by the image selection portion 234 and the thumbnails of the images that are described by the image data on the image data that are supplied from the digital signal processing portion 210. This makes it possible for the user to determine whether or not the object image data 36 can attract attention when they are uploaded, and also makes it possible to efficiently capture an image that can attract attention when it is uploaded.

When the user performs a specific operation on the thumbnails 38 on the display screen 30 that is shown in FIG. 3, the video signal generation processing portion 216 generates a video signal that includes the image-related information, as shown in FIG. 8.

FIG. 8 is an explanatory figure that shows a specific example of a display screen that includes the image-related information. As shown in FIG. 8, a display screen 31 includes, in addition to the image data 36 that have been acquired by image capture and the thumbnails 38 for the image data that have high scores, image-related information 39 that pertains to the thumbnail 38a that has been selected by the user. As shown in FIG. 8, the image-related information 39 may include the number of accesses to the image data that correspond to the thumbnail, the most recent accessing parties, the data when and the location where the image was captured, the names of the groups to which the accessing parties belong, comments that the accessing parties have written about the image, and the like. The video signal generation processing portion 216 may also display only the names of the accessing parties who have registered as friends with a specific service. This configuration makes it possible for the user to understand not only the content of the image data that attract a high degree of attention, but also more detailed information, such as what sorts of users exhibit a high degree of attention, what levels of attention the users exhibit, and the like. Note that it is also possible for the image-related information 39 to be displayed constantly, without depending on a user operation.

FIG. 9 is an explanatory figure that shows a modified example of the display screen. On a display screen 32 that is shown in FIG. 9, the plurality of the thumbnails 38a to 38c are arranged such that they are superimposed on one another. This configuration makes it possible to enlarge the display area for the image data 36 that have been acquired by the image capture, so an improvement in usability would be expected. Note that the display of the thumbnails 38 may also be started in accordance with a clicking operation or a flagging operation.

Image Processing

Next, return to the explanation of the functions of the CPU 230, with reference to FIG. 4. When the user performs a specific operation on one of the thumbnails 38 other than the operation for displaying the image-related information, the processing execution portion 236 sets the image capture setting and executes the application that are associated with the thumbnail 38. For example, in a case where the thumbnail 38 on which the user has performed an operation corresponds to image data that were captured in a state in which a scene selection condition was set to "human figure and night scene", the processing execution portion 236 may change the image capture setting to "human figure and night scene", as shown in FIG. 10. In this case, the displayed thumbnail 38 corresponds to image data that attract a high degree of attention, so by changing the image capture setting that is applied to the image data and applying the application to the image data, the capturing of image data that can attract attention can be supported.

Note that in a case where the operation for displaying the image-related information is a short click on the thumbnail 38, an operation for executing processing on the thumbnail 38 may be a click-and-hold operation. Furthermore, in a case where the operation for displaying the image-related information is a click-and drag operation on the thumbnail 38 from below, the operation for executing processing on the thumbnail 38 may be a short click on the thumbnail 38.

The image capture setting and the application that are associated with the thumbnail 38 on which the user has performed an operation may also be embedded in the image data, and they may also be the results of the analysis by the image analysis portion 233.

2-2. Operation of the Image Capture Device According to the First Embodiment

The configuration of the image capture device 20 according to the first embodiment of the present disclosure has been explained above. Next, the operation when the image data are acquired from the service provider servers 10 and the operation when an image is captured will be explained.

Operation when the Image Data are Acquired

FIG. 11 is a flowchart that shows the operation when the image data are acquired. As shown in FIG. 11, first, the network I/F 248 of the image capture device 20 acquires the image data and the image-related information from external servers such as the service provider servers 10 and the like (Step S304). Then the internal memory 246 stores the image data and the image-related information that have been acquired by the network interface 248 (Step S308).

Next, the score processing portion 232 specifies the scores that indicate the degrees of attention for the image data that have been acquired by the network interface 248 from each of the service provider servers 10, then extracts the image data for which high scores have been specified (Step S312).

Next, the image analysis portion 233 analyzes the image data for the images for which high scores were specified according to the combinations of the groups and the screening conditions that were extracted by the score processing portion 232, then infers the image capture settings at the times when the images were acquired and the applications that were executed for the image data (Step S316). The results of the analysis by the image analysis portion 233 are stored in the internal memory 246 in association with the image data.

Operation when an Image is Captured

FIG. 12 is a flowchart that shows the operation when an image is captured. As shown in FIG. 12, first, when the user selects the combination of the service, the group, and the screening condition (Step S320), the image selection portion 234 selects the image data for which high scores have been specified according to the selected combination (Step S324). Then when the image data are selected by the image selection portion 234, the video signal generation processing portion 216, by superimposing one of the image data that were selected by the image selection portion 234 and the thumbnails of the images that are described by the image data on the image data that were produced by the image capture and that are supplied from the digital signal processing portion 210, causes the display portion 218 to display the display screen 30 that is shown in FIG. 3 (Step S324).

Thereafter, in a case where the operation for displaying the image-related information has been performed by the user (Step S328), the video signal generation processing portion 216 causes the display portion 218 to display the image-related information for the thumbnail that has been selected by the user, as shown in FIG. 8 (Step S332).

Then, in a case where the operation for executing processing has been performed by the user (Step S336), for one of the image data that were produced while the image capture device 20 was not capturing images and the image data that were produced while the image capture device 20 was capturing images, the processing execution portion 236 executes the image capture setting and the application that are associated with the thumbnail 38 that has been selected by the user (Step S340).

3. Second Embodiment

The first embodiment of the present disclosure has been explained above.

In the first embodiment, an example was explained in which thumbnails of images with high degrees of attention are displayed when the image data are captured, but as will hereinafter be explained in the second embodiment, the image publication support system can also recommend uploading to the user when the image data are played back.

3-1. Configuration of the Image Capture Device According to the Second Embodiment FIG. 13 is an explanatory figure that shows functions of a CPU 231 of the image capture device 20 according to the second embodiment. As shown in FIG. 13, the CPU 231 has the functions of the score processing portion 232, the image analysis portion 233, and a similar image search portion 237. The functions of the score processing portion 232 and the image analysis portion 233 are the same as were explained in the first embodiment, so detailed explanations will be omitted.

The similar image search portion 237 searches for the image data for images whose degrees of similarity to the images for which the image data that have been read from the internal memory 246, the external media 224, or the like and are being played back are not less than a threshold value, and for which high scores were specified according to the combinations of the groups and the screening conditions that are designated by the user in the service provider servers 10. The similar image search portion 237 may also search for the image data for images for which one of or a combination of the image capture setting, the composition, a human figure in the image, the image capture position, and the image capture time resemble the image for which the image data are being played back.

When the similar image search portion 237 finds the image data, one of the image data that were found and a thumbnail of the image that is described by the image data is supplied to the video signal generation processing portion 216. The image data for playback are also supplied to the video signal generation processing portion 216 from the internal memory 246, the external media 224, or the like. The video signal generation processing portion 216 may cause the display portion 218 to display the display screen that is shown in FIG. 14 by superimposing the thumbnail of the image that is described by the image data that were found over the image that is described by the image data that are being played back.

FIG. 14 is an explanatory figure that shows a specific example of the display screen.

As shown in FIG. 14, a display screen 34 includes image data 37 that are being played back, the thumbnail 38a that is described by the image data that were found by the similar image search portion 237, and the image-related information 39. The image-related information 39 are the same as were explained in the first embodiment, so a detailed explanation will be omitted.

As shown in FIG. 14, the display screen 34 also includes a display that recommends that the image data that are being played back be uploaded, such as a message 35 that reads, "Uploading recommended". This configuration makes it possible for the user to determine that the image data that are being played back are image data that can attract attention from other users.

Note that the similar image search portion 237 may also determine, based on one of file information, a tag, and meta-information, whether or not a given set of the image data has already been uploaded, such that image data that have already been uploaded will not be uploaded again.

An example has been explained in which the similar image search portion 237 searches for the image data whose degrees of similarity to the image data that are being played back are not less than the threshold value, and for which high scores were specified according to the combinations of the groups and the screening conditions that are designated by the user in the service provider servers 10, but the present embodiment is not limited to this example. For example, the similar image search portion 237 may also search among the image data that are stored in the internal memory 246, the external media 224, or the like for the image data whose degrees of similarity are not less than the threshold value, and for which high scores were specified according to the combinations of the groups and the screening conditions that are designated by the user in the service provider servers 10.

3-2. Operation of the Image Capture Device According to the Second Embodiment

The configuration of the image capture device 20 according to the second embodiment of the present disclosure has been explained above. Next, the operation of the image capture device 20 according to the second embodiment will be explained with reference to FIG. 15.

FIG. 15 is a flowchart that shows the operation of the image capture device 20 according to the second embodiment. As shown in FIG. 15, first, when the user selects the combination of the service, the group, and the screening condition (Step S410), the similar image search portion 237 searches, among the image data for which high scores have been specified according to the selected combination, for the similar image data that resemble the image data that are being played back (Step S420).

In a case where the similar image data are found by the similar image search portion 237 (Step S430), the video signal generation processing portion 216 causes the display portion 218 to display a thumbnail of the image that is described by the similar image data, as well as a message that prompts the user to upload the image data that are being played back (Step S440).

In a case where the operation for displaying the image-related information has been performed by the user (Step S450), the video signal generation processing portion 216 causes the display portion 218 to display the image-related information for the thumbnail that has been selected by the user, as shown in FIG. 14 (Step S460).

4. Conclusion

As explained above, according to the embodiments of the present disclosure, the image publication support system can display, at the time that an image is captured, a thumbnail of an image that has a high degree of attention, and can easily reproduce the image capture setting for the image data that describe the image that has the high degree of attention. Furthermore, in addition to displaying the thumbnail of the image that has the high degree of attention, the image publication support system can recommend the uploading of image data that can attract attention from other users, even when the image data are being played back.

The information that is presented, such as the thumbnail that is described above, is not merely a general recommendation or an image capture technology, but is information that is matched to the needs of persons who are related to the group that the user has designated, so the image publication support system is able to support the capture of images that are matched to the needs of persons who are related to the specific group. The screening condition can also be set to be random. In that case, the image publication support system can support the capture of images that are suited to needs that the user has not recognized until now. The desire to upload captured image data cyclically is expected to increase, so the user can enjoy even more communications that use the image data.

The image publication support system can also provide further opportunities for communication by recommending, during playback, the uploading of image data that are suited to potential needs but have not been uploaded.

Note that the preferred embodiments of the present disclosure have been explained in detail with reference to the attached drawings, but the technical scope of the present disclosure is not limited to these examples. It should be understood by those skilled in the art that various modifications, combinations, sub-combinations and alterations may occur depending on design requirements and other factors insofar as they are within the scope of the appended claims or the equivalents thereof.

For example, the individual steps in the processing by the image capture device 20 in the present disclosure do not necessarily have to be performed in a temporal sequence in the order that is described in the flowcharts. The individual steps in the processing by the image capture device 20 may also be performed, for example, in an order that is different from the order that is described in the flowcharts, and they may also be performed in parallel.

The hardware that is incorporated into the image capture device 20, such as the CPU 230 and the like, can also be configured in the form of computer programs that perform functions that are equivalent to those of the configurations of the image capture device 20 that have been described above. A storage medium that stores the computer programs may also be provided.

The present disclosure may be configured as below.

(1) An information processing system including circuitry configured to acquire a first captured image; acquire a plurality of second images; and generate display data including the first captured image and at least a subset of the plurality of second images based on an evaluation parameter corresponding to each of the plurality of second images.

(2) The information processing system of (1), wherein the evaluation parameter indicates a degree of attention of a user to who is not using the information processing system.

(3) The information processing system of (2), wherein the evaluation parameter is based on an operation of the user.

(4) The information processing system of any of (1) to (3), further including a communication interface configured to acquire the plurality of second images from a service provider via a network.

(5) The information processing system of any of (1) to (4), further including an interface configured to acquire the plurality of second images from a plurality of service providers via a network.

(6) The information processing system of (5), further including a user interface configured to receive a user input selecting at least one of the plurality of service providers from which the plurality of second images is acquired, wherein the circuitry is configured to control acquiring the plurality of second images from the at least one of the plurality of service providers based on the received user input.

(7) The information processing system of any of (1) to (6), further including a user interface configured to receive a user input selecting at least one of a plurality of classification groups corresponding to the plurality of second images, wherein the circuitry is configured to control acquiring the plurality of second images corresponding to the at least one of the plurality of classification groups based on the received user input.

(8) The information processing system of any of (1) to (7), further including a user interface configured to receive a user input selecting at least one of a plurality of characteristics corresponding to a popularity of the plurality of second images, wherein the circuitry is configured to control acquiring the plurality of second images corresponding to the at least one of the plurality of characteristics based on the received user input.

(9) The information processing system of any of (1) to (8), further including a display configured to display the display data generated by the circuitry; and an image capturing device configured to capture the first captured image.

(10) The information processing system of any of (1) to (9), further including a memory configured to store the plurality of second images and the evaluation parameter corresponding to each of the plurality of second images.

(11) The information processing system of any of (2) to (10), wherein the evaluation parameter for each of the plurality of second images is based on the at least one of a group classification of the image, a number of times the image has been accessed, a number of times the image has been cited, and a number of times the image has been commented on.

(12) The information processing system of (11), wherein the circuitry is configured to acquire, for each of the plurality of second images, at least one of the group classification of the image, the number of times the image has been accessed, the number of times the image has been cited, and the number of times the image has been commented on; and determine the evaluation parameter for each of the plurality of second images based on the at least one of the group classification of the image, the number of times the image has been accessed, the number of times the image has been cited, and the number of times the image has been commented on.

(13) The information processing system of (12), wherein the circuitry is configured to select the at least a subset of the plurality of second images to be included in the generated display data based on the determined evaluation parameter for each of the plurality of second images.

(14) The information processing system of (11), wherein the circuitry is configured to include, in the generated display data, at least one of the group classification of the image, the number of times the image has been accessed, the number of times the image has been cited, and the number of times the image has been commented on for each of the at least a subset of the plurality of second images to be included in the generated display data.

(15) The information processing system of any of (1) to (14), wherein the circuitry is configured to perform an image analysis on each of the plurality of second images to identify an image capture setting corresponding to each of the plurality of second images.

(16) The information processing system of (15), wherein the circuitry is configured to select the at least a subset of the plurality of second images to be included in the generated display data by comparing the identified image capture settings corresponding to each of the plurality of second images with image capturing setting corresponding to the first captured image.

(17) The information processing system of any of (15) to (16), further including a user interface configured to display the at least the subset of the plurality of second images and receive a user selection corresponding to one of the at least the subset of the plurality of second images.

(18) The information processing system of (17), wherein the circuitry is configured to change image capture settings corresponding to the first captured image data based on the identified image capture settings of the one of the at least the subset of the plurality of second images selected based on the user input.

(19) The information processing system of (9), further including a wireless interface configured to send and receive data via a wireless communication network.

(20) An information processing method performed by an information processing system, the method comprising: acquiring a first captured image; acquiring a plurality of second images; and generating display data including the first captured image and at least a subset of the plurality of second images based on an evaluation parameter corresponding to each of the plurality of second images.

(21) A non-transitory computer-readable medium including computer-program instructions, which when executed by an information processing system, cause the system to: acquire a first captured image; acquire a plurality of second images; and generate display data including the first captured image and at least a subset of the plurality of second images based on an evaluation parameter corresponding to each of the plurality of second images.

(22) The information processing system of (1), wherein the plurality of second images are each thumbnail images.

(23) The information processing system of (2), wherein the information processing system is a mobile phone including a camera unit configured to capture the first captured image.

(24) The information processing system of (19), wherein the mobile phone includes a wireless interface configured to send and receive voice communication via a wireless communication network.

(25) A display control device including:
an acquisition portion that acquires, from at least one service provider server on a network that controls image data, data that pertain to at least one set of image data; and
a display control portion that generates a display screen that includes an object image and a display that is based on data pertaining to image data according to a degree of attention for the at least one set of image data among the data that have been acquired by the acquisition portion.

(26) The display control device according to (25), wherein the data pertaining to the image data include one of the image data and thumbnail data of the image data.

(27) The display control device according to (25) or (26), further including: an image selection portion that makes a preferential selection of data pertaining to image data with a high degree of attention from the data that have been acquired by the acquisition portion,
wherein the display control portion generates a display screen that includes a display that is based on the data that the image selection portion has made the selection of.

(28) The display control device according to (27), wherein the image selection portion makes the selection from the data acquired from the service provider server designated by a user.

(29) The display control device according to (28), wherein the image selection portion makes the selection in accordance with a degree of attention within a group designated by the user among a plurality of groups that are controlled by the service provider server designated by the user.

(30) The display control device according to any one of (27) to (29),
wherein the image selection portion identifies the degree of attention in accordance with a condition designated by a user.

(31) The display control device according to any one of (25) to (30), further including:
a processing portion that performs processing on the object image, the processing being associated with a display selected from the display that is based on the data pertaining to the at least one set of image data.

(32) The display control device according to any one of (25) to (31), further including:
an image capture portion,
wherein the object image is an image captured by the image capture portion.

(33) The display control device according to any one of (25) to (31), further including:
a storage portion,
wherein the object image is an image acquired by playing back image data stored in the storage portion.

(34) The display control device according to (33),
wherein the display control portion, in a case where, among the data that have been acquired by the acquisition portion, data exist that pertain to image data whose degree of similarity with the object image is greater than a similarity threshold value and whose degree of attention is greater than an attention threshold value, generates a display screen that includes a display that facilitates the object image to be uploaded to the at least one service provider server.

(35) A display control method including:
acquiring, from at least one service provider server on a network that controls image data, data that pertain to at least one set of image data; and
generating a display screen that includes an object image and a display that is based on data pertaining to image data, among the at least one set of image data according to a degree of attention for the at least one set of image data among the data that pertain to the at least one set of image data.

(36) A program for causing a computer to function as:
an acquisition portion that acquires, from at least one service provider server on a network that controls image data, data that pertain to at least one set of image data; and
a display control portion that generates a display screen that includes an object image and a display that is based on data pertaining to image data according to a degree of attention for the at least one set of image data among the data that have been acquired by the acquisition portion.

REFERENCE SIGNS LIST

10 Service provider server
12 Network
20 Image capture device
202 Image capture lens
204 Image sensor
206 Analog signal processing portion
208 A/D conversion portion
210 Digital signal processing portion
212 Audio input portion
214 Data conversion portion
216 Video signal generation processing portion
218 Display portion
220 Audio signal generation processing portion
222 Audio output portion
224 External media
226 I/O control portion
228 Operation input portion
230 CPU
232 Score processing portion
233 Image analysis portion
234 Image selection portion
236 Processing execution portion
237 Similar image search portion
240 Control bus
242 Program memory
244 RAM
246 Internal memory
248 Network I/F

The invention claimed is:
1. An image capturing apparatus, comprising:
circuitry configured to:
control display of a through image to be captured by the image capturing apparatus;

control display of a screening condition selection screen including a plurality of selection items for screening conditions;

select a selection item from the plurality of selection items based on a first user input;

control display of a plurality of thumbnail images corresponding to the selected selection item, wherein the plurality of thumbnail images is different from the through image, the plurality of thumbnail images includes a first thumbnail image and a second thumbnail image, and the first thumbnail image is displayed adjacent to the second thumbnail image;

change an image capture setting applied to the through image to an image capture setting of the first thumbnail image based on a second user input on the first thumbnail image; and control display of information related to the image capture setting of the first thumbnail image on the through image, wherein the first thumbnail image and the information related to the image capture setting of the first thumbnail image are superimposed on the through image.

2. The image capturing apparatus of claim 1, wherein each thumbnail image of the plurality of thumbnail images is associated with image-related information of a corresponding thumbnail image.

3. The image capturing apparatus of claim 2, wherein the image-related information is associated with a user-selected thumbnail image of the plurality of thumbnail images, and the image-related information comprises at least one of a number of accesses to the user-selected thumbnail image, user information associated with recent accesses to the user-selected thumbnail image, data associated with capture of the user-selected thumbnail image, or user comments on the user-selected thumbnail image.

4. The image capturing apparatus of claim 2, wherein the circuitry is further configured to control display of the image-related information of one of the plurality of thumbnail images based on a click-and-hold operation on a respective thumbnail image of the plurality of thumbnail images, and the image-related information of the respective thumbnail image indicates a plurality of user groups accessing image data of the respective thumbnail image.

5. The image capturing apparatus of claim 1, wherein the circuitry is further configured to control display of a message on an image captured by the image capturing apparatus, and the message indicates a recommendation for upload of the image.

6. The image capturing apparatus of claim 1, wherein at least one thumbnail image of the plurality of thumbnail images includes a facial image of a human figure in the through image.

7. The image capturing apparatus of claim 1, wherein the circuitry is further configured to execute an effect related to the first thumbnail image on the through image.

8. A method, comprising:

controlling display of a through image to be captured by an image capturing apparatus;

controlling display of a screening condition selection screen including a plurality of selection items for screening conditions;

selecting a selection item from the plurality of selection items based on a first user input;

controlling display of a plurality of thumbnail images corresponding to the selected selection item, wherein the plurality of thumbnail images is different from the through image, the plurality of thumbnail images includes a first thumbnail image and a second thumbnail image, and the first thumbnail image is displayed adjacent to the second thumbnail image;

changing an image capture setting applied to the through image to an image capture setting of the first thumbnail image based on a second user input on the first thumbnail image; and controlling display of information related to the image capture setting of the first thumbnail image on the through image, wherein the first thumbnail image and the information related to the image capture setting of the first thumbnail image are superimposed on the through image.

9. The method of claim 8, wherein each thumbnail image of the plurality of thumbnail images is associated with image-related information of a corresponding thumbnail image.

10. The method of claim 9, wherein the image-related information is associated with a user-selected thumbnail image of the plurality of thumbnail images, and the image-related information comprises at least one of a number of accesses to the user-selected thumbnail image, user information associated with recent accesses to the user-selected thumbnail image, data associated with capture of the user-selected thumbnail image, or user comments on the user-selected thumbnail image.

11. The method of claim 9, further comprising:

controlling display of the image-related information of one of the plurality of thumbnail images based on a click-and-hold operation on a respective thumbnail image of the plurality of thumbnail images, wherein the image-related information of the respective thumbnail image indicates a plurality of user groups accessing image data of the respective thumbnail image.

12. A non-transitory computer-readable medium having stored thereon computer-executable instructions that, when executed by a computer, cause the computer to execute operations, the operations comprising:

controlling display of a through image to be captured by an image capturing apparatus;

controlling display of a screening condition selection screen including a plurality of selection items for screening conditions;

selecting a selection item from the plurality of selection items based on a first user input;

controlling display of a plurality of thumbnail images corresponding to the selected selection item, wherein the plurality of thumbnail images is different from the through image, the plurality of thumbnail images includes a first thumbnail image and a second thumbnail image, and the first thumbnail image is displayed adjacent to the second thumbnail image;

changing an image capture setting applied to the through image to an image capture setting of the first thumbnail image based on a second user input on the first thumbnail image; and controlling display of information related to the image capture setting of the first thumbnail image on the through image, wherein
the first thumbnail image and the information related to the image capture setting of the first thumbnail image are superimposed on the through image.

\* \* \* \* \*